United States Patent
Halata

(10) Patent No.: US 9,589,353 B2
(45) Date of Patent: Mar. 7, 2017

(54) METHOD FOR DETECTING OBJECTS IN A WAREHOUSE AND/OR FOR SPATIAL ORIENTATION IN A WAREHOUSE

(71) Applicant: Jungheinrich Aktiengesellschaft, Hamburg (DE)

(72) Inventor: Philipp Halata, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 437 days.

(21) Appl. No.: 14/180,872

(22) Filed: Feb. 14, 2014

(65) Prior Publication Data
US 2014/0232826 A1 Aug. 21, 2014

(30) Foreign Application Priority Data
Feb. 15, 2013 (DE) .................. 10 2013 002 554

(51) Int. Cl.
| | | |
|---|---|---|
| H04N 13/02 | (2006.01) | |
| G06T 7/00 | (2006.01) | |
| G06K 9/00 | (2006.01) | |

(52) U.S. Cl.
CPC .......... *G06T 7/004* (2013.01); *G06K 9/00201* (2013.01); *G06K 9/00691* (2013.01); *H04N 13/0203* (2013.01)

(58) Field of Classification Search
CPC ............ G06K 9/00201; G06K 9/00691; G06T 7/004; H04N 13/0203
See application file for complete search history.

(56) References Cited

U.S. PATENT DOCUMENTS

| | | | | |
|---|---|---|---|---|
| 5,938,710 A | * | 8/1999 | Lanza .................... | B66F 9/063 180/169 |
| 6,487,303 B1 | * | 11/2002 | Yamaguchi ........... | G06T 7/0044 382/103 |
| 6,736,587 B2 | * | 5/2004 | Magens .............. | B60L 11/1822 414/673 |

(Continued)

FOREIGN PATENT DOCUMENTS

EP 2468678 A1 6/2012

*Primary Examiner* — Nhon Diep
(74) *Attorney, Agent, or Firm* — Stuart Mayer; Mayer & Williams PC

(57) ABSTRACT

A method for detecting objects in a warehouse and/or for spatial orientation in a warehouse includes:
- acquiring image data with a 3-D camera which is fastened to an industrial truck so that a viewing direction of the 3-D camera has a defined horizontal angle, wherein the 3-D camera has an image sensor with sensor elements arranged matrix-like and the image data comprises a plurality of pixels, wherein distance information is assigned to each pixel,
- calculating angle information for a plurality of image elements, which each specify an angle between a surface represented by the image element and a vertical reference plane,
- determining a predominant direction based on the frequency of the calculated angle information,
- calculating the positions of the of the acquired pixels along the predominant direction,
- detecting at least one main plane of the warehouse based on a frequency distribution of the calculated positions.

11 Claims, 6 Drawing Sheets

(56) References Cited

U.S. PATENT DOCUMENTS

| | | | |
|---|---|---|---|
| 7,219,769 B2* | 5/2007 | Yamanouchi | B66F 9/0755 |
| | | | 187/222 |
| 2010/0231926 A1* | 9/2010 | Manken | G01S 3/784 |
| | | | 356/614 |

* cited by examiner

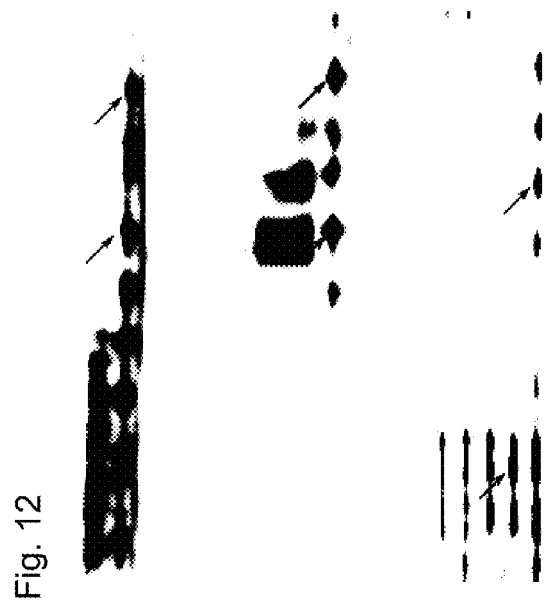
Fig. 12
Fig. 10
Fig. 11
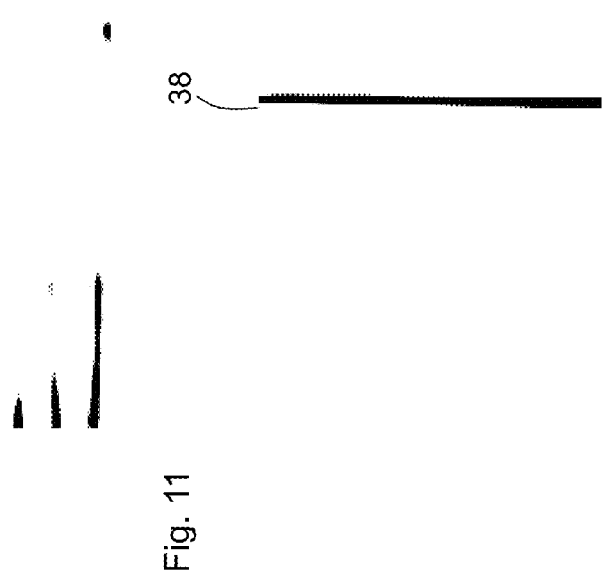

METHOD FOR DETECTING OBJECTS IN A WAREHOUSE AND/OR FOR SPATIAL ORIENTATION IN A WAREHOUSE

BACKGROUND OF THE INVENTION

The invention relates to a method for detecting objects in a warehouse and/or for spatial orientation in a warehouse, in which image data is acquired and evaluated. For this purpose it is known in the field of warehouse logistics to equip industrial trucks with laser scanners. These, in particular in combination with reflective markers positioned in the warehouse, can deliver information about the position of the industrial truck in the warehouse, and in this manner supplement or completely replace other navigation systems. The use of laser scanners is known also for supporting storage and retrieval procedures.

It is known from the document EP 2 468 678 A2 to arrange a time-of-flight camera system on an industrial truck, and in this manner to acquire a three-dimensional image of the surroundings of the industrial truck. This is used in particular for supporting an operator in that storage and retrieval procedures are automated to some extent.

Based on this background, the object of the invention is to provide a method for detecting objects in the warehouse and/or for spatial orientation in a warehouse, with which the acquisition and evaluation of three-dimensional image data is better adapted to the specific use conditions of an industrial truck so that it can be implemented easily and reliably, and an industrial truck suited for this purpose.

SUMMARY OF THE INVENTION

This object is solved by the method with the features of claim 1. Advantageous designs are specified with the subsequent sub-claims.

The method serves for detecting objects in a warehouse and/or for spatial orientation in a warehouse and has the following steps:
  acquiring image data with a 3-D camera which is fastened to an industrial truck so that a viewing direction of the 3-D camera has a defined angle to the horizontal, wherein the 3-D camera has an image sensor with sensor elements arranged matrix-like and the image data comprises a plurality of pixels, wherein distance information is assigned to each pixel,
  calculating angle information for a plurality of image elements, which specify an angle between a surface represented by the image element and a vertical reference plane,
  determining a predominant direction based on the frequency of the calculated angle information,
  calculating the positions of the acquired pixels along the predominant direction,
  detecting at least one main plane of the warehouse based on a frequency of the calculated positions.

The image data acquired with the 3-D camera is a spatial image of the surrounding area because distance information is assigned to each pixel. Such image data is also called a cluster of points. The cluster of points contains a plurality of points whose arrangement in space is described by the specification of the coordinates in a three-dimensional coordinate system. A Cartesian coordinate system, for example, whose axes directions have a fixed orientation relative to the viewing direction of 3-D camera can be used for this purpose. For example, the x-axis can point in the viewing direction of the 3-D camera toward the right, the y-axis can point perpendicularly downward, and the z-axis can point in the viewing direction of the 3-D camera. The image sensor has sensor elements arranged matrix-like, for example in a rectangular raster having 640×480 sensor elements. Each sensor element can correspond to a pixel. In order to assign distance information to each pixel, different techniques are used depending on the type of the 3-D camera being used. For example, the 3-D camera supplies image data having 640×480 pixels which are identified by their x, y, and z coordinates.

With the invention, angle information is calculated for a plurality of image elements. Each image element can be an individual pixel, or a plurality of mathematically combined pixels. Each image element represents a surface, that is, a surface of an object in the image field of the 3-D camera, more or less facing the 3-D camera. The angle information describes an angle between this surface and a vertical reference plane. The vertical reference plane can be a vertical plane in the viewing direction of the 3-D camera for example. In the above named example of a coordinate system this would be the y-z plane. However, another vertical plane can also be used as the reference plane, in particular a vertical plane arranged fixed relative to the arrangement of the 3-D camera.

In order to calculate the necessary angle information, initially a normal vector on the surface represented by the image element can be calculated. Then, the angle between this normal vector and the reference plane can be calculated. This corresponds to a projection of the normal vector onto a horizontal plane in which the angle to the reference plane can be shown.

A predominant direction is determined based on the frequency of the calculated angle information. A histogram of calculated angle information can be created for this purpose, wherein all calculated angles which are located in specific angle intervals, are summed. The maximum of this histogram specifies in which of the angle intervals there is the largest number of the tested image elements relative to the reference plane. This most frequently occurring alignment of the image elements relative to the reference plane represents a predominant direction.

After determining the predominant direction, the positions of the acquired pixels are calculated along the predominant direction. These positions correspond to the distances of the individual pixels from an imaginary plane that is perpendicular to the predominant direction. Mathematically this can be accomplished, for example, by a coordinate transformation into a new coordinate system, wherein one of the axes of the new coordinate system is aligned in the predominant direction. Then, the coordinate of a pixel for this axis direction corresponds to the position to be calculated.

Finally, a main plane of the warehouse is detected based on a frequency distribution of the calculated positions. For this purpose a histogram can also be created, this time for the calculated positions, which in turn can be "sorted into" position intervals of predetermined size. A maximum of this frequency distribution indicates that at the associated position, thus, in a plane perpendicular to the predominant direction, a particularly large number of pixels were detected at this specific position along the predominant direction. Therefore, this plane represents a main plane of the warehouse. The maximum of the frequency distribution of the calculated positions can be an absolute maximum or a local maximal. If the frequency distribution has several maximums, several main planes of the warehouse can also be detected in the described manner.

The detection of main planes provides a spatial orientation in the warehouse because the detected main planes represent, in particular, distinctive structures in the warehouse. However, if the method is used for detecting objects in the warehouse, on the one hand the detection of the main plane can be connected with specific objects and are as such detected. On the other hand a further evaluation of the image data utilizing the detected main planes can occur, whereby—as will be described below—further objects can be detected particularly easily in addition to the main planes.

With the invention, the typical conditions of warehouses administered with industrial trucks are exploited. The inventors have recognized that the essential structures of such warehouses, for example walls, shelves, individual shelf support, pallets or transport containers stored on the shelves, wall and cover surfaces, etc. are generally arranged at right angles to each other. Here, the horizontal and the vertical directions play a special role that are typically strictly adhered to by the floor surfaces of individual warehouse spaces, and respectively the most different vertical supports and many other lateral surfaces. Due to this, typical warehouses differ substantially from other environments, for example, the surroundings of a motor vehicle traveling on a highway.

The invention exploits these particular conditions of typical warehouses in order to specifically simplify the evaluation of the image data which is very time consuming and computationally intensive. Thus, the fact that the viewing direction of the 3-D camera has a defined angle to the horizontal is utilized with the calculation of the angle information so that angle information with respect to the vertical reference plane can be calculated directly. The subsequent evaluation steps are based substantially on frequency distributions, which is particularly easy with a computer-supported evaluation of the image data. As a result, the relevant main planes of the warehouse can be detected with low computational expenditure, that is with relatively inexpensive computers and/or particularly quickly, and however still reliably.

In one design, the image elements for which the angle information is calculated, are calculated in each case by averaging all pixels contained in a specified volume element. In principle, angle information can be calculated for each acquired pixel. In order to be able to interpret the individual pixels as a surface with a defined direction, the evaluation must consider adjacent pixels. The calculation of the angle information is therefore relatively time-consuming. If a plurality of the acquired pixels are combined using averaging into one image element that then represents a larger surface of the acquired scene, correspondingly less angle information must be calculated. The averaging can occur over all pixels contained in a specified volume element, that is, the space populated by the cluster of points is divided into a plurality of uniform cubic volume elements. For example the volume elements, also called a voxel, can have edge lengths in the range of 5 cm to 40 cm, preferably approximately 20 cm. Tests have shown that even with use of such a relatively coarse raster, the main planes of a typical warehouse environment are reliably detected. At the same time, the computation time for the evaluation of the image data is significantly reduced because the averaging over the pixels of the volume element is performed substantially faster than the calculation of a corresponding larger amount of angle information.

In one design, one of the main planes is a wall plane, which is detected at a first position and perpendicular to the predominant direction, if the frequency distribution at the first position has a first maximum and the number of the pixels with positions further remote from the industrial truck is less than a preset first limit value. Wall surfaces of the warehouse located in the image field of the 3-D camera generally lead to a distinct maximum in the frequency distribution of the positions. Characteristic for wall surfaces here is that no further pixels are located behind, thus at greater distances from the industrial truck. If these conditions are present, a wall plane is detected. With the detection of the wall plane, the preset first limit value excludes individual pixels acquired behind the wall plane probably due to measurement errors (noise).

In one design, one of the main planes is a shelf front plane, which is detected at a second position and perpendicular to the predominant direction if the frequency distribution at the second position has a second maximum and the second position is arranged closer to the 3-D camera than the first position by 0.9 m to 1.7 m. A shelf front plane is the closest front surface of a shelf facing the 3-D camera. With typical warehouses, the shelf front plane is frequently located at a distance of approximately 1.2 m in front of a wall. If the wall remains visible through the shelf at least to some extent, a histogram of the positions provides two maximums: a first maximum at a greater distance from the 3-D camera, which characterizes the wall plane, and a second maximum at a second position in the range of 0.9 m to 1.7 m in front of the wall plane. If these conditions are present, a shelf front plane is detected at the second position.

In one design, one of the main planes is a shelf front plane, which is detected at a third position and perpendicular to the predominant direction if the frequency distribution has only a single distinct maximum that is arranged at the third position, and the number of pixels with positions further remote from the 3-D camera is greater than a predefined second limit value. This constellation results in a typical warehouse when no wall is visible behind the shelf. In this case, there is a single distinct maximum in the histogram of the positions at the location of the shelf front plane. The pixels acquired behind the shelf front plane can be caused by stored items or rear shelf supports. Their number exceeds the predefined second limit value and aids detecting a single distinct maximum as a shelf front plane and not as a wall surface.

In one design, the method has the following further steps:
  projecting the pixels, which lie in a surrounding area of a detected main plane onto this main plane, and
  detecting objects of the warehouse using comparison of the projected, two-dimensional data with predefined templates.

In other words, the detected main plane is used for detecting further objects in the warehouse. For this purpose, pixels which are located in a surrounding area of the main plane are initially projected onto the main plane. The surrounding area can be characterized, for example, by a predefined distance range from the detected main plane. For example, all acquired pixels which are located at a distance of less than 25 cm in front of the detected main plane and less than 1.2 m behind the detected main plane, are projected onto the main plane. In this example, if the detected main plane is a shelf front plane, even with consideration of tolerances with acquiring the pixels, all pixels which belong to objects within the shelves are included in the further evaluation. After the projection of the thusly preselected pixels onto the main plane, there is a further evaluation based on the projected, two-dimensional data. This is therefore computationally less intensive. With the design, pattern detection methods in which the projected, two-dimensional data are compared with predefined templates are used. These methods are also known as "template matching". One advantage of using a 3-D camera as a basis for this template matching method is that the data to be evaluated has the proper scaling, which simplifies the template matching. With the template matching, initially using the named comparison, degrees of similarity are determined between the predefined template and the specific region of the projected, two-dimensional data. These correspond to probabilities that the acquired data are traced back to an object corresponding to the predefined template. For specific structures extending frequently beyond the height or width of the image, the thusly determined degrees of similarity can be summed by rows or by columns. For example, for detecting horizontal shelf supports, the determined degrees of similarity are summed by rows. The rows with the overall highest degree of similarity represent a horizontal shelf-support with high probability. This is also true for vertical shelf supports with which the degrees of similarity that are found are added on a column basis.

A subsequent plausibility assessment can be added to the stated evaluation steps. If pallets are detected with the template matching that are, for example, not located within 20 cm above a horizontal shelf support or above the floor, these cannot be pallets. In this case no palette is detected at the cited location. The same is true for a pallet whose position is intersected by a vertical shelf support. In this case, either the first detected object is not a pallet or the second detected object is not a vertical shelf support.

The object specified above is also solved by the method with the features of claim 7. Advantageous designs are specified in the subsequent sub-claims.

The method serves for detecting objects in a warehouse and/or for spatial orientation in a warehouse and has the following steps:

acquiring image data with a 3-D camera which is fastened to an industrial truck so that a viewing direction of the 3-D camera has a defined angle to the horizontal, wherein the 3-D camera has an image sensor with sensor elements arranged matrix-like, and the image data comprises a plurality of pixels, wherein a color value and distance information is assigned to each pixel,
  segmenting the image data into contiguous segments based on the color value,
  calculating segment attributes for each segment,
  classifying the segments based on the segment attributes,
  detecting a warehouse object based on the classification.

With respect to acquiring the image data, reference is made to the preceding explanation. A difference consists in that now in addition to distance information associated with each pixel, a color value is also acquired for each pixel.

After acquiring the image data, these are segmented into contiguous segments based on the color value. The individual segments comprise pixels which are in a logical relationship. For the segmenting, the known Felzenszwalb-Huttenlocher algorithm can be used for example.

Subsequently, segment attributes are calculated for each segment that then form the basis for a classification of the segment. The detection of a warehouse object occurs then based on the classification.

This method also allows individual warehouse objects to be detected, or to be spatially oriented in the warehouse based on the detected objects. The segmenting of the image data at the very beginning of the evaluation simplifies the subsequent evaluation steps, which makes the method particularly practical for use in conjunction with an industrial truck.

In one design, one or more of the following properties are used as segment attributes: dimensions, average color value, number of pixels, relative depth information. For calculating the dimensions of the segments, initially the alignment of the respective segment must be determined. For this purpose, the largest surface of the segment can be defined as the front side, for example. This definition can occur based on an evaluation of the most frequent normal directions of the pixels belonging to this segment, or respectively of the surfaces represented by these, as described in detail in conjunction with the first method according to the invention. In order to keep the computational expense low, processing work can be performed again using image elements which represent a plurality of the acquired pixels, for example again by averaging. The division of the overall image volume used for allocating the acquired pixels can in turn occur using equally sized cubes, for example having a uniform edge length of approximately 5 cm. The dimensions can be acquired in three dimensions, wherein each segment can be approximated as a cuboid. The relative depth information can be calculated from the difference of an object farthest remote from the 3-D camera (for example a wall surface) to the object in the viewing direction (i.e. at the same angle about a vertical axis) and the distance of the object from the 3-D camera. This relative depth information allows a simple evaluation of the in front/behind relationship between different segments.

Also, as with the dimensions, the average color value of individual segments can also provide important information about the object represented by the segment in question. For example, pallets generally have a gray-brown color, whereas shelf supports are also painted in a typical color. Thus, the segment attribute "average color value" also provides important information for the proper classification of the segment. The number of pixels of a segment also has significance for the proper classification. In particular, in conjunction with a simultaneous determination of the segment attribute "dimensions", the number of pixels can provide information about the closedness of the surface.

In one design, a "support vector machine" is used for the classification. A support vector machine is a computer program that is used for classifying objects based on a machine training procedure. Each object to be classified is represented by a vector in a vector space. With the invention, the objects to be classified are the segments which are each described by a vector. The vector contains all the segment attributes assigned to the segment in question. Training objects that belong to the predefined classes are used for "training" the support vector machine. For example, the known objects in a data set acquired with the 3-D camera can be manually assigned to the predefined classes for this purpose. Based on such training data sets, the support vector machines learn proper classification of the segments. The result is a reliable classification with relatively low computational expense and an ongoing optimization of the classes used, without having to perform substantial theoretical considerations for the individual segment attributes of the predefined classes. As a result, the method is particularly simple and automatically adapts to the respective circumstances. Properties of typical warehouses that many warehouses have in common—for instance the presence of vertical shelf supports—but also individual warehouse circumstances, for example the lighting situation count among these circumstances.

In one design, one or more of the following classes are considered with the classification of the segments: vertical supports, horizontal shelf support, signs, transport boxes, walls, pallets. In particular, all of these classes can be considered, and thus the entirety of the objects present in a typical warehouse are completely classified to a large extent.

In one design, segments lying above one another which were classified as a vertical shelf support, and/or segments lying next to each other, which were classified as a horizontal shelf-support, are combined respectively into a segment group. Segments lying above one another means segments which are arranged at the same lateral position in the warehouse but at different heights. Correspondingly, segments lying next to each other means segments which are located at the same height but have a lateral distance from each other. The segment groups formed in this manner represent the entirety of a horizontal, or a vertical, shelf support, even when this was only detected piecewise. Likewise it is also possible to expand the thusly formed segment groups, namely by segments not classified as vertical or horizontal shelf support that are located between two segments classified as such. In this case, the segment groups then comprise in each case the entirety of a horizontal or a vertical shelf support.

In one design, a segment is detected as a pallet if the following criteria are satisfied:
  the segment was classified with a minimum probability as a pallet and/or
  a center point of the segment is located within a predefined height range above a horizontal shelf-support and within a predefined distance range behind the front and/or
  a comparison of the front side of the segment with a predefined template of a pallet yields a minimum degree of similarity.

In particular, a segment can be detected as a pallet only when all three criteria are satisfied. The criteria are a type of plausibility assessment for the detection of a pallet. Not only the classification of the respective segment is considered, but also the arrangement of the segment relative to a horizontal shelf support and, if applicable, additionally the agreement of a front side of the segment with a predefined template. For the methods used here for the template matching, reference is made to the explanations above, which are applicable correspondigly. On the whole, by satisfying the criteria, a particularly high probability is attained that a segment detected as a pallet actually represents a pallet.

In one design, a vacant warehouse space is detected if there are no pixels, or respectively segments, present in a defined spatial region above an object that was detected or classified as a horizontal shelf support. In this manner, based on each of the two methods according to the invention, warehouse spaces can be made detectable.

In one design the dimensions of a load are determined by evaluation of the pixels, or respectively segments, acquired above an object detected as a pallet. In particular, all acquired pixels, or respectively segments, that are arranged beneath a horizontal shelf support detected above the pallet can be considered. The dimensions of the load can in turn be approximated by a cuboid that encloses all pixels acquired above the pallet.

In one design, the industrial truck has a navigation system that provides position data for the position of the industrial truck in the warehouse, and the position data are adapted under consideration of a detected main plane and/or a detected object. In principle, an orientation can be established in the space using only the method according to the invention so that a conventional navigation system is not necessary. In the named design however, the method is combined with such a navigation system. Then each of the methods according to the invention can be used for refining the position data which was acquired using the conventional navigation system. The conventional navigation system can for example provide a location of the position of the industrial truck using radio, or by means of one or more laser scanners, or by means of odometry. By considering the main planes and/or objects, the position data provided by such a system can be corrected and can possibly be made substantially more precise.

In one design, the 3-D camera is a time-of-flight camera or a camera system that projects and maps a defined template on the image field, and from a shift of the template determines the distance information. Time-of-flight cameras are known for acquiring three-dimensional image data. They illuminate the image field with a modulated light intensity, in particular in the infrared range, and evaluate a phase shift of the light signal reflected by the objects located in the image range. The phase shift arises due to different travel times of the light on the path from the light source arranged integrated in the 3-D camera, or near the 3-D camera, to the reflecting items and back. The Kinect System from Microsoft is a known camera system that acquires distance information based on a projected template. It combines a two-dimensional VGA camera with a distance measuring system that is based on the triangulation principle.

The object specified above is also solved by an industrial truck with the features of claim 17. The industrial truck has an apparatus for detecting objects in a warehouse and/or for spatial orientation in a warehouse, wherein the apparatus comprises the following:
  a 3-D camera for acquiring image data, wherein the 3-D camera is fastened to the industrial truck so that a viewing direction of the 3-D camera has a defined angle to the horizontal, an image sensor having sensor elements arranged matrix-like and the image data comprises a plurality of pixels, to each of which distance information is assigned,
  an evaluation apparatus for evaluating the image data that is designed for the purpose of calculating angle information, which each specify an angle between a surface represented by the image element and a vertical reference plane, for a plurality of image elements, based on the frequencies of the calculated angle information determining a predominant direction, calculating positions of the acquired pixels along the predominant direction, and detecting at least one main plane of the warehouse based on a frequency distribution of the calculated positions.

For explanation, reference is made to the explanation above for the corresponding method. The industrial truck is equipped for performing this method. It is understood that also all particulars of the invention described above in conjunction with the industrial truck according to the invention can be used. For this purpose in particular the evaluation apparatus can be designed for performing the method steps of one or more of the sub-claims 2 to 6 or 13 to 15. The 3-D camera can be designed corresponding to the features of claim 16.

The object specified above is also solved by the industrial truck with the features of claim 18. The industrial truck has an apparatus for detecting objects in a warehouse and/or for spatial orientation in a warehouse, wherein the apparatus comprises the following:

a 3-D camera for acquiring image data, wherein the 3-D camera is fastened to the industrial truck so that a viewing direction of the 3-D camera has a defined angle to the horizontal, an image sensor having sensor elements arranged matrix-like, and the image data comprises a plurality of pixels, to each of which a color value and distance information is assigned, an evaluation apparatus for evaluating the image data that is designed for the purpose of segmenting the image data into contiguous segments based on the color value, calculating segment attributes for each of the segments, classifying the segments based on the segment attributes, and detecting a warehouse object based on the classification.

For explanation, reference is made to the explanation above for the corresponding method. The industrial truck is equipped for performing this method. It is understood that also all particulars of the invention described above in conjunction with the industrial truck according to the invention can be used. For this purpose the evaluation apparatus can in particular be designed for performing the method steps of one or more of the sub-claims 8 to 15. The 3-D camera can be designed corresponding to the features of claim 16.

BRIEF DESCRIPTION OF THE DRAWINGS

The invention is explained in greater detail below based on two exemplary embodiments shown in several figures. The figures show.

DETAILED DESCRIPTION OF THE INVENTION

Figure 1:
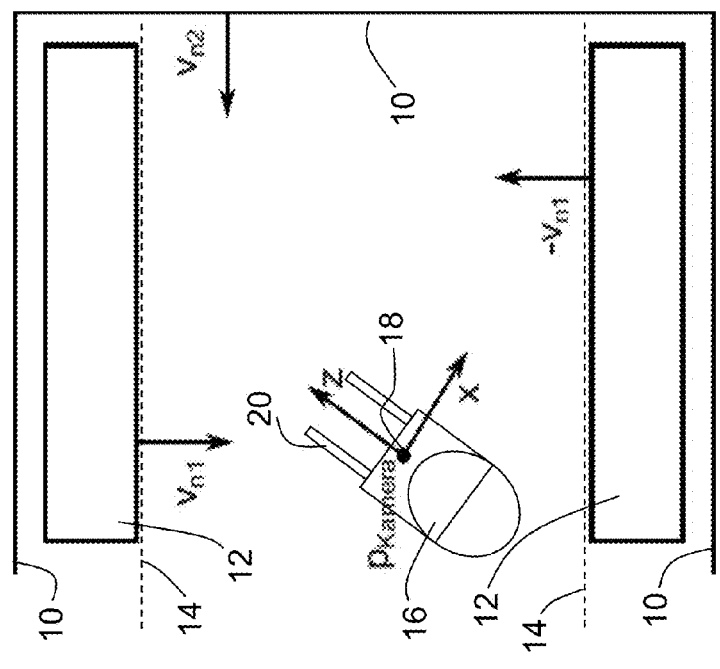
FIG. 1 a schematic representation of a warehouse from above.

FIG. 1 shows a schematic view of a typical high-bay warehouse from above. The warehouse comprises three wall surfaces 10 aligned vertically and at right angles to each other. A shelf 12 is located in each case in front of two of the wall surfaces 10 that are across from each other. The front sides of the shelves 12, removed from the wall surfaces 10, are each located in a shelf front plane 14.

The warehouse is managed by an industrial truck 16 which has a 3-D camera 18. The 3-D camera 18 is fastened to the industrial truck 16 so that the viewing direction thereof has a defined angle to the horizontal. A coordinate system indicated in FIG. 1 is aligned corresponding to the viewing direction of the 3-D camera 18, the z-axis of which is in the viewing direction of the 3-D camera 18. The x-axis of this coordinate system points toward the right in the viewing direction of 3-D camera, and the y-axis, not shown, points downward. The industrial truck 16 has a main travel direction in the direction toward the indicated load support means 20 that corresponds to the z-axis in the viewing direction of the 3-D camera 18.

Figure 2:
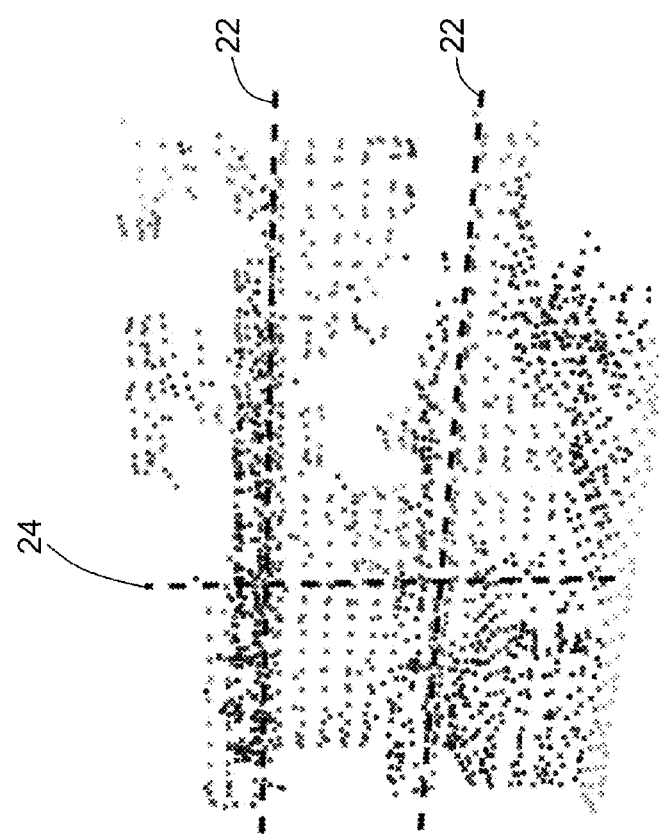
FIG. 2 an illustration of a cluster of points.

FIG. 2 shows, as an example, an image data set acquired with the 3-D camera 18 after using a voxel grid filter (see below). This is a cluster of points having a plurality of acquired pixels to each of which are assigned three coordinates so that the position in space of each acquired individual pixel is known. FIG. 2 shows a perspective representation of the cluster of points such that the depth information assigned to the individual pixels is only vague. However upon observing the cluster of points in this perspective representation, it can already be recognized that the acquired pixels are clustered along the dotted bolded lines 22, 24. The lines 22 characterize the progression of two horizontal shelf supports, the line 24 characterizes the progression of a vertical shelf support.

A first method according to the invention for evaluating the image data is described in more detail using the FIGS. 3 to 12. Initially the volume, in which the acquired pixels are arranged, is divided into a plurality of equally sized cubes. Cubes with a uniform edge length of 20 cm, for example, can be used. The acquired image points within each of the cubes are averaged and represent only a single image element for a part of the subsequent evaluation.

Then, angle information is calculated for each of the image elements that specifies an angle between a surface represented by the image element and a vertical reference plane. The vertical reference plane can be the y-z plane, for example, of the coordinate system indicated in FIG. 1. In order to calculate this angle information, initially a normal vector can be calculated considering the adjacent image elements for each image element. The angle between this normal vector and the reference plane is the required angle information.

Figure 3:
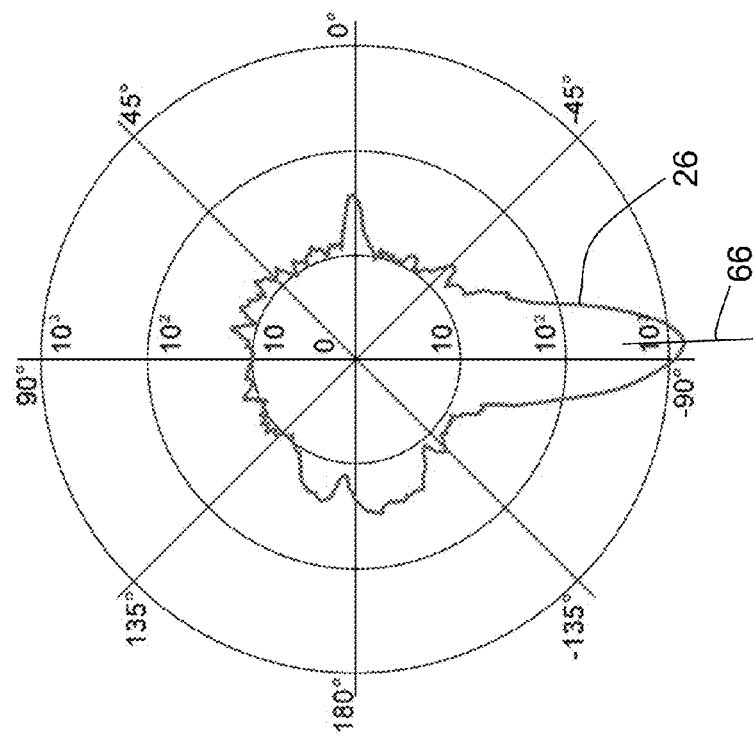
FIG. 3 a histogram for angle information of image elements.

FIG. 3 shows a histogram in which the angle information is sorted for all image elements. The 0° position on the right in the diagram corresponds to the viewing direction of the 3-D camera 18. The angle division revolves forming a circle about a center point of the diagram. The distance of the represented curve 26 from the center point of the diagram specifies the frequency of the individual angle information. The histogram is shown after a smoothing. A distinct maximum can be recognized near the −90° position.

Thus, the image data contain particularly many image elements whose normal vectors have this angle to the reference plane. With this, the maximum of a histogram characterizes a predominant direction 66 in the acquired image data. Because the 0° direction corresponds to the viewing direction of the 3-D camera, this means that particularly many image elements were acquired that are aligned somewhat perpendicular to the viewing direction of the camera. In other words, the 3-D camera 18 in the represented example views approximately directly in front of relatively large surface structures, approximately on a wall surface or a front shelf plane.

After determining the predominant direction 66 based on the data represented in FIG. 3, with the first method according to the invention a further evaluation is performed based on the originally acquired image data (as represented in FIG. 2). Positions along the predominant direction 66 are calculated for each of the acquired pixels. These positions can specify, for example, the distances to the 3-D camera 18 measured along the predominant direction 66. In addition, another reference plane that is perpendicular to the predominant direction 66 can be used as an origin for this position determination.

Figure 4:
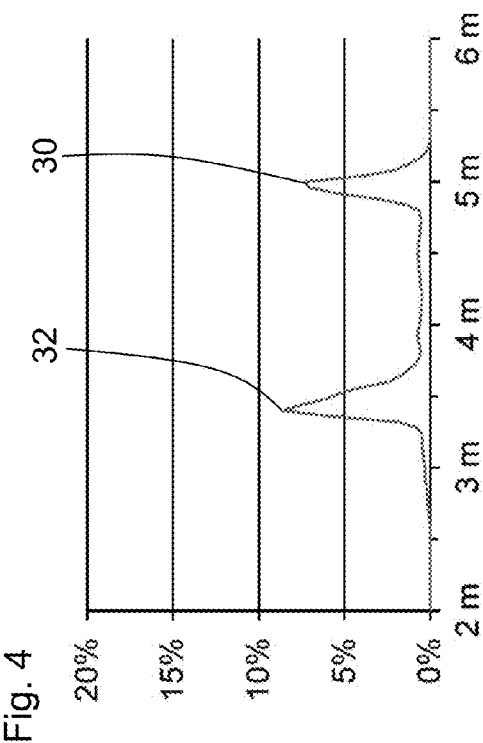
FIG. 4 a histogram of the positions of the acquired pixels along a predominant direction, FIG. 5 a further histogram of the positions of the acquired pixels along a predominant direction for another image data set, FIG. 6 a two-dimensional representation of the pixels acquired in a surrounding area of a shelf front plane, FIG. 7 a predefined template that represents a horizontal shelf support, FIG. 8 a predefined template that represents a vertical shelf support, FIG. 9 a predefined template that represents a pallet, FIG. 10 a diagram for the results of a comparison of the data from FIG. 6 with the predefined template from FIG. 7, FIG. 11 a diagram for the results of a comparison of the data from FIG. 6 with the predefined template from FIG. 8, FIG. 12 a diagram for the results of a comparison of the data from FIG. 6 with the predefined template from FIG. 9, FIG. 13 a representation of image data divided into a plurality of segments, FIG. 14 a schematic representation for determining the dimensions of a segment, FIG. 15 a schematic representation for the definition of a relative depth information, FIG. 16 the image data represented in FIG. 13 after a classification.
Figure 5:
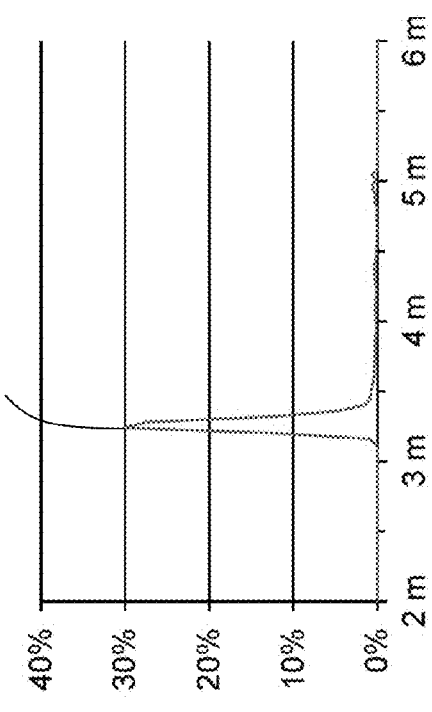

The positions of the acquired pixels along the predominant direction 66, calculated in this manner, are illustrated in the FIGS. 4 and 5 in further histograms. In the example of FIG. 4, two clearly distinct maximums 30, 32 can be seen that are located at distances of approximately 3.5 m and approximately 5 m from the 3-D camera 18. It should be noted that considering a tolerance, no pixels are recorded at distances greater than the first maximum 30 at approximately 5 m. This indicates that the first maximum 30 is a wall plane. The second maximum 32 is located approximately 1.5 m closer to the 3-D camera 18 in the predominant direction 66 than the first maximum 30. This indicates that the second maximum 32 is a front shelf plane 14 of a shelf 12 that is in front of the wall surface 10.

FIG. 5 shows another example in which only a single maximum is arranged at a third position of approximately 3.3 m. At greater distances however, in contrast to the first maximum 30 of FIG. 4, there are a certain number of further acquired pixels. This can be interpreted such that the single maximum 34 is also a shelf front plane 14; the associated shelf 12 is however not placed in front of a wall surface 10 or the wall surface 10 is not visible through the shelf 12.

Figure 6:
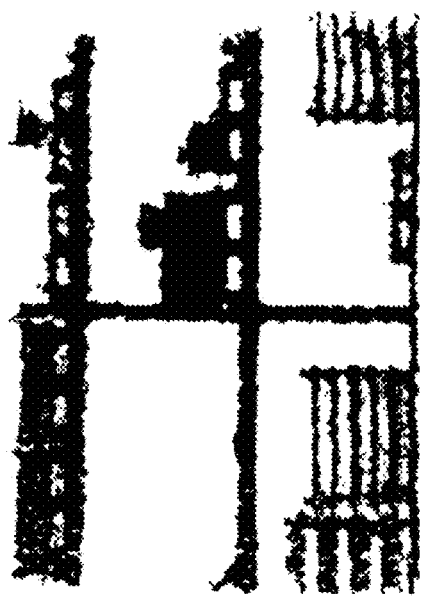

In a next evaluation step, the pixels acquired in a surrounding area of a main plane are projected onto this main plane, and preferably along the predominant direction 66. FIG. 6 shows the results of the example of a shelf front plane 14. After the projection, the data are two-dimensional. Dark pixels indicate that at least one pixel was acquired at the respective position in the surrounding area of the shelf front plane 14. The further evaluation can occur using these projected, two-dimensional data which significantly reduces the computational expense.

Figure 8:
Figure 9:
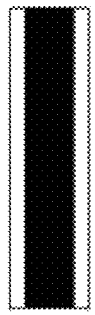
Figure 7:

For this purpose, with the first method according to the invention, a comparison of the projected, two-dimensional data from FIG. 6 is performed with predefined templates. The FIGS. 7 to 9 show three such predefined templates, namely FIG. 7 shows a template of a horizontal shelf support, FIG. 8 shows a template of a vertical shelf support, and FIG. 9 shows a template of a pallet. These predefined templates are compared with the image data of FIG. 6, in that they are placed at different positions over the image data and the number of coinciding pixels are determined. In particular, the predefined templates with the center points thereof can be placed at the position of each individual pixel of FIG. 6 (with the exception of an edge region).

The results of such a procedure are shown in FIGS. 10 to 12. The points appearing dark in these figures show positions of the predefined template relative to the image data at which the similarity is particularly high. It can be seen in FIG. 10, which shows a comparison to the template of FIG. 7, that distinct horizontal running dark stripes 36 are located just below the upper edge of the image and approximately in the middle of the image. These are traced back to horizontal shelf supports. FIG. 11 shows the results of the comparison to the template of FIG. 8. A noticeable vertical running dark stripe 38 arranged somewhat to the right of the center of the image specifies the position of a vertical shelf support.

FIG. 12 shows the results of the comparison to the template of FIG. 9. Points with particularly high agreement with the template of FIG. 9 representing a pallet are emphasized by small arrows. A careful observer recognizes by comparison with FIG. 6, that at all arrows located in the upper and right region of the image are actually the center points of the pallets that can be recognized in FIG. 6. The arrow located below left however is not at the position of a pallet in FIG. 6, but rather is apparently an accidental agreement of structures acquired in this image region tracing back to the template of FIG. 9.

In order to avoid detecting a pallet at this position in the further procedure, a plausibility control can be performed. For example, a further criterion can be required that objects to be detected as a pallet are arranged within a specific distance above a horizontal shelf support or the floor. This criterion would not be satisfied at the position of the arrow represented below left in FIG. 12 such that the accidental agreement of the structure acquired there would not lead to the detection of a pallet.

Figure 13:
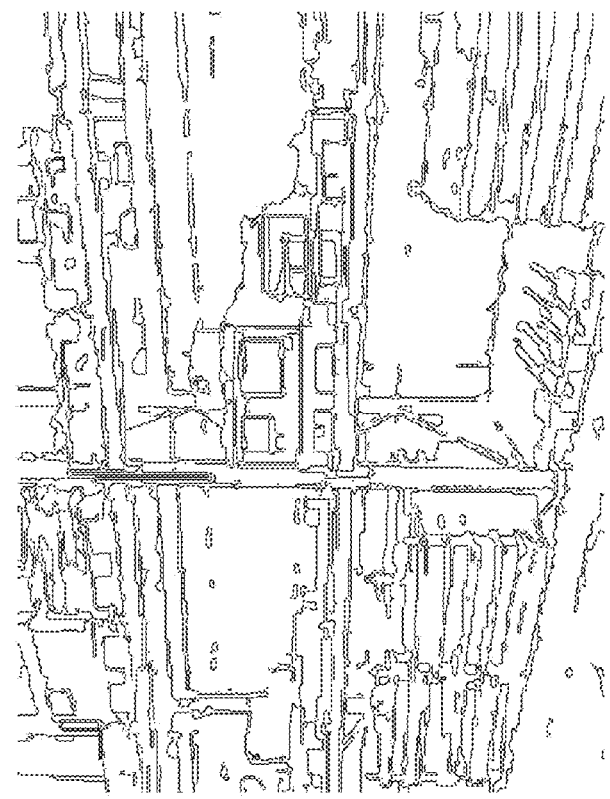

A second method according to the invention is described in more detail using the FIGS. 13 to 16. The starting point of the evaluation is again an image data set provided by the 3-D camera 18, wherein with this method each acquired pixel is assigned not only three-dimensional coordinates thereof, but additionally also a color value. Appropriate image data is provided, for example, by the Microsoft Kinect camera, mentioned above. As a first evaluation step, there is a segmenting of the image data based on these color values. For this purpose a Felzenszwalb-Huttenlocher algorithm is used which operates on the colors of the cluster of points. In this manner the acquired pixels are subdivided into a plurality of segments, where there is a logical correlation between the acquired pixels of each segment. In FIG. 13, instead of a color representation typical for the purposes of presentation, only the contours are represented between adjacent segments.

Figure 14:
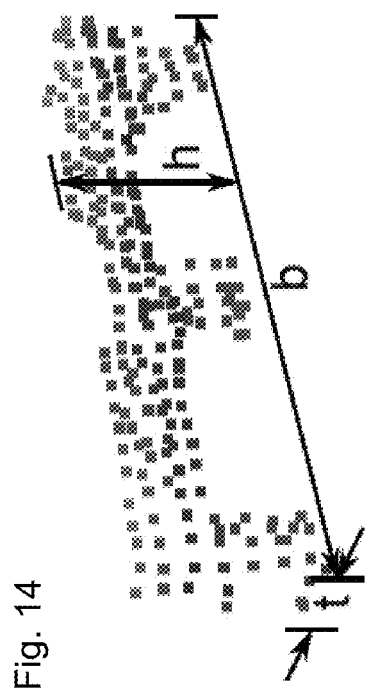
Figure 15:
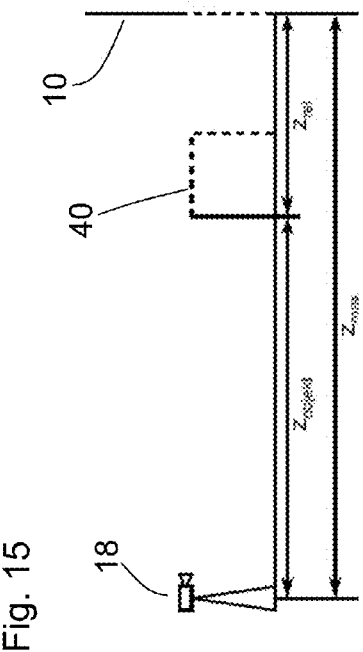

Then, segment attributes are calculated for each segment. For this purpose, the dimensions of the segments in three dimensions, for example, can be used. These can be calculated based on the pixels belonging to the segment, as shown in FIG. 14. Here, a cube, for example, in which lie all pixels belonging to the segment, can be calculated. In this manner, a width b, height h and a depth t are obtained for the segment.

A relative depth information is a further helpful segment attribute for the later classification. This is explained using FIG. 15. The 3-D camera 18 can be seen on the left, and a wall surface 10 can be seen completely on the right. An object 40 that is represented as a segment is located between the two. The distance between the 3-D camera 18 and wall surface 10 is referred to as $z_{max}$. The distance between the 3-D camera 18 and object 40 is referred to as $z_{object}$. The relative depth information is referred to as $z_{rel}$, and results in the difference $z_{max}-z_{Object}$.

Figure 16:
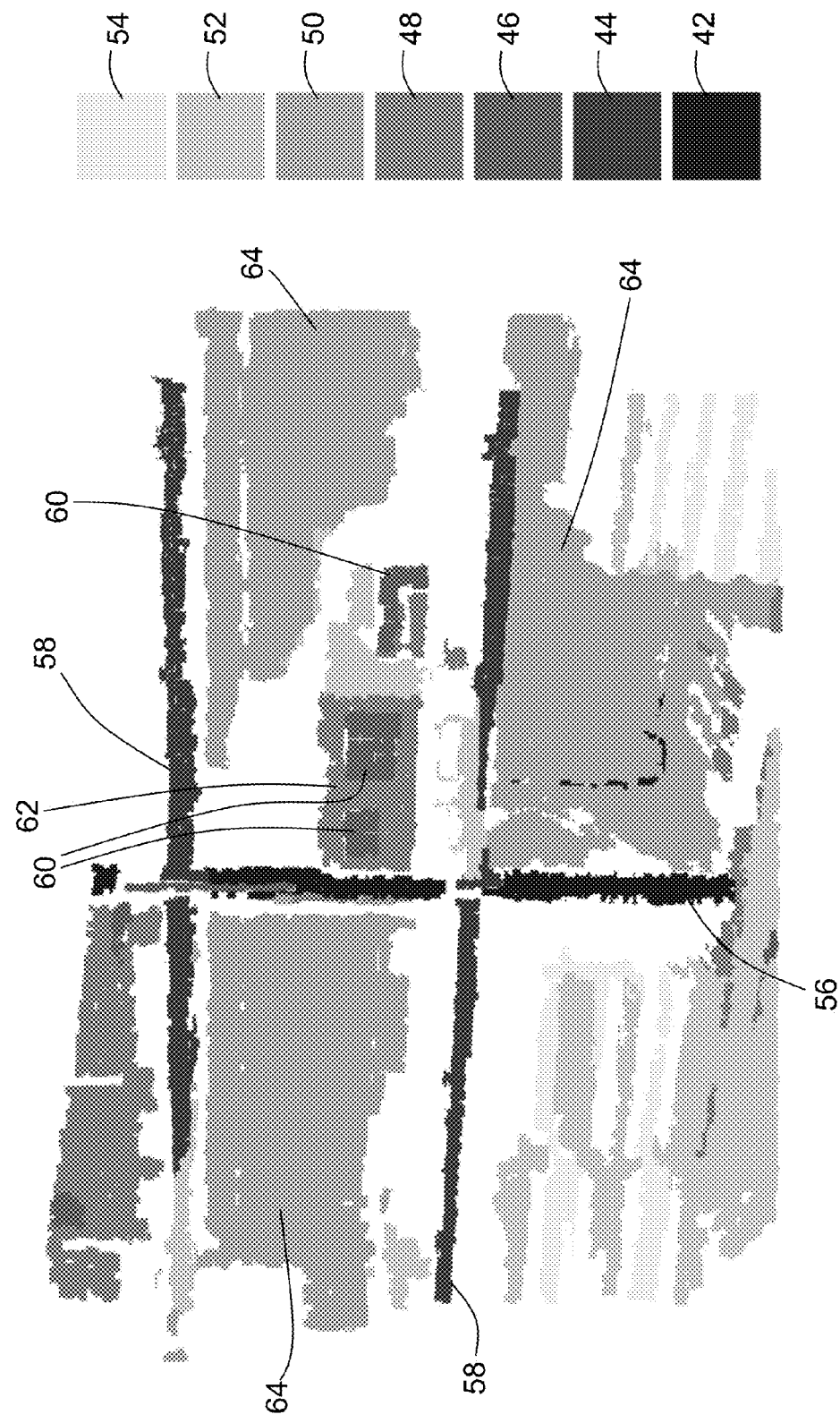

After the calculation of the segment attributes for each segment there is a classification of the segments using a support vector machine. The result of this classification is shown in FIG. 16 in which the identified classes are illustrated using different gray values. The darkest level of gray 42 corresponds to the vertical shelf support class. The segments classified as such form a vertical stripe 56 in the FIG. 16.

The second darkest level of gray 44 illustrates the horizontal shelf support class. The segments classified as such are located in two horizontal running stripes 58 in FIG. 16 (considering the perspective representation).

The third darkest level of gray 46 corresponds to the sign class. Segments 60 detected as such are located most noticeably above the lower horizontal shelf support and to the right of the vertical shelf support. They are located at the front side of further segments 62, which were classified as transport boxes, represented by the next lighter level of gray 48.

A further level of gray 50 represented in FIG. 16 corresponds to the wall surface class. Corresponding segments 64 can be seen, in particular, within the shelf compartments formed between the individual shelf supports.

A still lighter level of gray 52 is for the pallet class, and in FIG. 16 is located predominantly below the segments 62 classified as a transport boxes. The legend comprises yet a further level of gray 54 which stands for a class not further described here.

The invention claimed is:

1. A method for detecting objects in a warehouse and/or for spatial orientation in a warehouse having the following steps:
    acquiring image data with a 3-D camera which is fastened to an industrial truck so that a viewing direction of the 3-D camera has a defined angle to the horizontal, wherein the 3-D camera has an image sensor with sensor elements arranged matrix-like and the image data comprises a plurality of pixels, wherein distance information is assigned to each pixel,
    calculating angle information for a plurality of image elements, which each specify an angle between a surface represented by the image element and a vertical reference plane,
    determining a predominant direction based on the frequencies of the calculated angle information,
    calculating the positions of the acquired pixels along the predominant direction,
    detecting at least one main plane of the warehouse based on a frequency distribution of the calculated positions.

2. The method according to claim 1, wherein the image elements for which the angle information is calculated, are calculated in each case using averaging over all pixels contained in a predefined volume element.

3. The method according to claim 1, wherein one of the main planes is a wall plane, which is detected at a first position and perpendicular to the predominant direction, if the frequency distribution at the first position has a first maximum and the number of pixels with positions further remote from the 3-D camera is less than a predefined first limit value.

4. The method according to claim 3, wherein one of the main planes is a shelf front plane, which is detected at a second position and perpendicular to the predominant direction, if the frequency distribution at the second position has a second maximum and the second position is arranged closer to the 3-D camera by 0.9 m to 1.7 m than the first position.

5. The method according to claim 1, further comprising one of the main planes is a shelf front plane, which is detected at a third position and perpendicular to the predominant direction, if the frequency distribution has only a single distinct maximum that is arranged at the third position, and the number of pixels with positions further remote from the 3-D camera is greater than a predefined second limit value.

6. The method according to claim 1, further comprising the further steps:
    projecting the pixels, which lie in a surrounding area of a detected main plane onto this main plane
    and detecting objects of the warehouse using comparison of the projected, two-dimensional data with predefined templates.

7. The method according to claim 1, further comprising a vacant warehouse space is detected if no pixels, or respectively segments, are present in a defined spatial region above an object that was detected or classified as a horizontal shelf support.

8. The method according to claim 1, further comprising the dimensions (b, h, t) of a load are determined by evaluating the pixels, or respectively segments, acquired above an object detected as a pallet.

9. The method according to claim 1, further comprising the industrial truck has a navigation system that provides position data for the position of the industrial truck in the warehouse, and that the position data are modified considering a detected main plane and/or a detected object.

10. The method according to claim 1, further comprising the 3-D camera is a time-of-flight camera or a camera system that projects and maps a defined template on the image field and that determines the distance information from a shift of the template.

11. An industrial truck with an apparatus for detecting objects in a warehouse and/or for spatial orientation in a warehouse, wherein the apparatus comprises the following:
    a 3-D camera for acquiring image data, wherein the 3-D camera is fastened to the industrial truck so that a viewing direction of the 3-D camera has a defined angle to the horizontal, an image sensor having sensor elements arranged matrix-like and the image data comprises a plurality of pixels, to each of which distance information is assigned,
    an evaluation apparatus for evaluating the image data that is designed for the purpose of calculating angle information, which each specify an angle between a surface represented by the image element and a vertical reference plane, for a plurality of image elements, determining a predominant direction based on the frequencies of the calculated angle information, calculating positions of the acquired pixels along the predominant direction, and detecting at least one main plane of the warehouse based on a frequency distribution of the calculated positions.

* * * * *